US012802143B2

(12) United States Patent
Oliver

(10) Patent No.: US 12,802,143 B2
(45) Date of Patent: Nov. 17, 2026

(54) SYSTEM AND METHOD OF A NUT PROCESSING SYSTEM SUPPORTING AUTOMATED TEMPERING

(71) Applicant: Modern Electronics and Equipment Inc., Grand Cane, LA (US)

(72) Inventor: Scott Staten Oliver, Stonewall, LA (US)

(73) Assignee: Modern Electronics and Equipment Inc.

(*) Notice: Subject to any disclaimer, the term of this patent is extended or adjusted under 35 U.S.C. 154(b) by 925 days.

(21) Appl. No.: 18/063,544

(22) Filed: Dec. 8, 2022

(65) Prior Publication Data

US 2023/0185281 A1 Jun. 15, 2023

Related U.S. Application Data

(60) Provisional application No. 63/287,887, filed on Dec. 9, 2021.

(51) Int. Cl.
*A23N 5/00* (2006.01)
*G06Q 50/02* (2012.01)

(52) U.S. Cl.
CPC ... *G06Q 50/02* (2013.01); *G05B 2219/50333* (2013.01)

(58) Field of Classification Search
CPC . A23N 5/08; G06Q 50/02; G05B 2219/50333
See application file for complete search history.

(56) References Cited

U.S. PATENT DOCUMENTS 3,249,219 A * 5/1966 Sanfilippo ................ A23N 5/08 209/464
3,478,875 A 11/1969 Roberts
3,574,343 A * 4/1971 Cutler .................... G05B 19/04 366/159.1
4,476,148 A * 10/1984 Harris ....................... A23J 1/14 426/507
5,197,375 A * 3/1993 Rosenbrock ........... G05D 23/22 99/335

(Continued)

FOREIGN PATENT DOCUMENTS

JP 2019510146 A 4/2019

OTHER PUBLICATIONS

How It's Made, "How Pecans Are Manufactured," 2019, https://www.youtube.com/watch?v=EhqW-eZ9Vtg.

(Continued)

*Primary Examiner* — Tiffany T Tran

(57) ABSTRACT

A method for automated tempering using a nut processing system includes obtaining, by at least one processor, a set of tempering parameters that includes a vacuum pressure parameter and a dwell time. The method includes controlling a vacuum pump to create a vacuum inside a tank that is sealed closed, the sealed tank containing water and nuts. The method includes determining whether a measured vacuum pressure of the vacuum satisfies a vacuum pressure condition defined by the vacuum pressure parameter. The method includes in response to a determination that the vacuum pressure condition is satisfied, tempering the nuts in the tank having the vacuum for the dwell time.

20 Claims, 5 Drawing Sheets

(56) References Cited

U.S. PATENT DOCUMENTS

| | | | | |
|---|---|---|---|---|
| 2005/0253019 | A1 * | 11/2005 | Hoehne | F28D 20/003<br>244/129.1 |
| 2006/0182858 | A1 * | 8/2006 | Foroutanaliabad | A23N 5/00<br>426/482 |
| 2011/0287138 | A1 * | 11/2011 | Malinsky | A23L 25/20<br>426/61 |
| 2016/0007638 | A1 * | 1/2016 | Fukumori | A47J 36/34<br>426/450 |
| 2017/0150843 | A1 * | 6/2017 | Rosalia | A47J 27/13 |

OTHER PUBLICATIONS

Kharel, K., et al., "Hot water treatment as a kill-step to inactivate *Escherichia coli* O157:H7, Salmonella enterica, Listeria monocytogenes and Enterococcus faecium on in-shell pecans," LWT, Nov. 2018, vol. 97, pp. 555-560.

* cited by examiner

SYSTEM AND METHOD OF A NUT PROCESSING SYSTEM SUPPORTING AUTOMATED TEMPERING

CROSS-REFERENCE TO RELATED APPLICATION(S) AND CLAIM OF PRIORITY

This application claims priority under 35 U. S. C. § 119(e) to U.S. Provisional Patent Application No. 63/287,887 filed on Dec. 9, 2021. The above-identified provisional patent application is hereby incorporated by reference in its entirety.

TECHNICAL FIELD

This disclosure generally relates to mechanized nut processing systems. More specifically, this disclosure relates to a system and method of a nut processing system supporting automated tempering of nuts, such as pecans.

BACKGROUND

Pecan processing includes harvesting, cleaning, cracking, and shelling. During the harvesting process, mechanized shakers shake the trunk of a tree, which causes nuts to fall onto the ground below. Harvesting also includes raking or sweeping the pecans off the ground and gathering them together into a hopper. After nuts have been harvested, the cleaning process includes separating in-shell nuts from leaves, husks, sticks, dirt, and rocks. After cleaning, cracking process includes tempering, sanitizing, and cracking nuts. Sanitizing includes using a sanitizing fluid (for example, hot water or a sanitizing solution (for example, chlorinated water)) to reduce pathogens on and inside of the shells. Tempering includes adding moisture to the kernel before the shell is cracked. During tempering, the nutshell absorbs moisture from outside, and then the kernel inside the shell further absorbs the moisture from inside the shell. A conventional method of tempering pecans endures or consumes tens of hours (for example, 12-24 hours).

SUMMARY

This disclosure provides a system and method of a nut processing system supporting automated tempering.

In a first embodiment, a method for automated tempering using a nut processing system is provided. The method includes obtaining, by at least one processor, a set of tempering parameters that includes a vacuum pressure parameter and a dwell time. The method includes controlling a vacuum pump to create a vacuum inside a tank that is sealed closed, the sealed tank containing water and nuts. The method includes determining whether a measured vacuum pressure of the vacuum satisfies a vacuum pressure condition defined by the vacuum pressure parameter. The method includes in response to a determination that the vacuum pressure condition is satisfied, tempering the nuts in the tank having the vacuum for the dwell time.

In a second embodiment, an electronic device supporting automated tempering in a nut processing system is provided. The electronic device includes a processor and a memory operatively connected to the processor. The memory stores one or more instructions that, when executed by the processor, cause the electronic device to obtain a set of tempering parameters that includes a vacuum pressure parameter and a dwell time. The electronic device also includes instructions that cause the electronic device to control a vacuum pump to create a vacuum inside a tank that is sealed closed, the sealed tank containing water and nuts. The electronic device also includes instructions that cause the electronic device to determine whether a measured vacuum pressure of the vacuum satisfies a vacuum pressure condition defined by the vacuum pressure parameter. The electronic device also includes instructions that cause the electronic device to temper the nuts in the tank having the vacuum for the dwell time, in response to a determination that the vacuum pressure condition is satisfied.

In a third embodiment, a nut processing system supporting automated tempering is provided. The system includes an electronic device supporting automated tempering. The electronic device includes a processor and a memory operatively connected to the processor. The memory stores one or more instructions that, when executed by the processor, cause the electronic device to obtain a set of tempering parameters that includes a vacuum pressure parameter and a dwell time. The electronic device also includes instructions that cause the electronic device to control a vacuum pump to create a vacuum inside a tank that is sealed closed, the sealed tank containing water and nuts. The electronic device also includes instructions that cause the electronic device to determine whether a measured vacuum pressure of the vacuum satisfies a vacuum pressure condition defined by the vacuum pressure parameter. The electronic device also includes instructions that cause the electronic device to temper the nuts in the tank having the vacuum for the dwell time, in response to a determination that the vacuum pressure condition is satisfied. The system also includes a vacuum pump, and a tank.

In a fourth embodiment, a non-transitory computer readable medium embodies computer readable program code that when executed causes at least one processor to obtain a set of tempering parameters that includes a vacuum pressure parameter and a dwell time. The computer readable program code when executed also causes the at least one processor to control a vacuum pump to create a vacuum inside a tank that is sealed closed, the sealed tank containing water and nuts. The computer readable program code when executed also causes the at least one processor to determine whether a measured vacuum pressure of the vacuum satisfies a vacuum pressure condition defined by the vacuum pressure parameter. The computer readable program code when executed also causes the at least one processor to in response to a determination that the vacuum pressure condition is satisfied, temper the nuts in the tank having the vacuum for the dwell time.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 4, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

For ease of explanation, the nut processing system in this disclosure is described as being a pecan nut processing system. However, it is understood that the embodiments of this disclosure are applicable to a nut processing system for processing other types of nuts, such as walnuts, cashews, peanuts, macadamia nuts, hazelnuts, almonds, pistachios, Brazil nuts, and so forth.

According to embodiments of this disclosure, before cracking the outer shell (also referred to as "nutshell") of a nut, the nut undergoes a process called tempering. Tempering includes adding moisture to the kernel before the nut is processed further, for example, before the nut undergoes sanitization. During tempering, the nutshell absorbs the moisture from outside the shell into the interior of the shell, and then the kernel inside the shell absorbs the moisture from the interior of the shell. The method of tempering pecans according to embodiments of this disclosure endures or consumes minutes, which is a significant reduction of time compared to the tens of hours that conventional methods of tempering consume.

Figure 1:
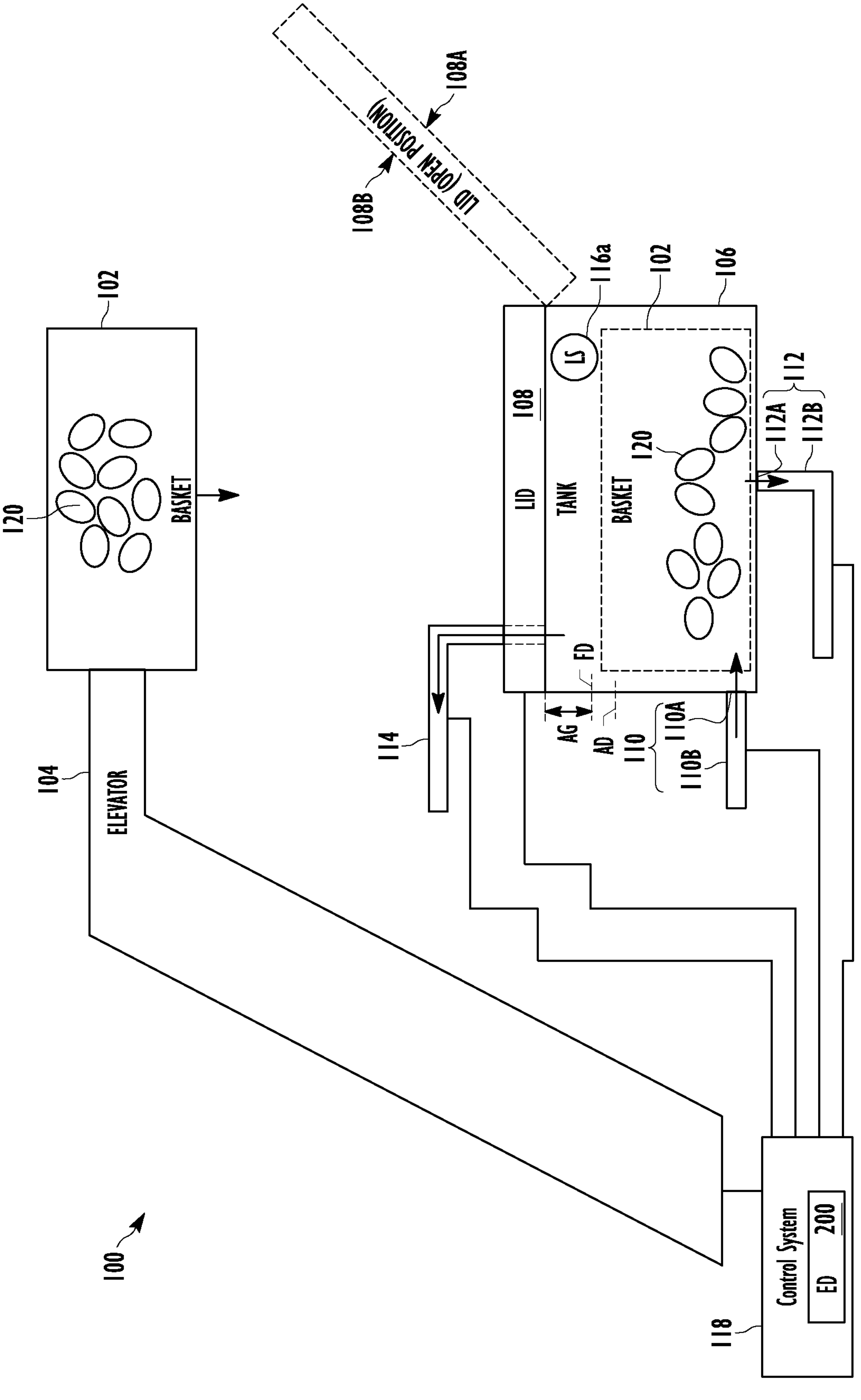
FIG. 1 illustrates an example nut processing system according to this disclosure.

FIG. 1 illustrates an example nut processing system 100 according to this disclosure. The embodiment of the nut processing system 100 shown in FIG. 1 is for illustration only. Other embodiments could be used without departing from the scope of the present disclosure.

Figure 2:
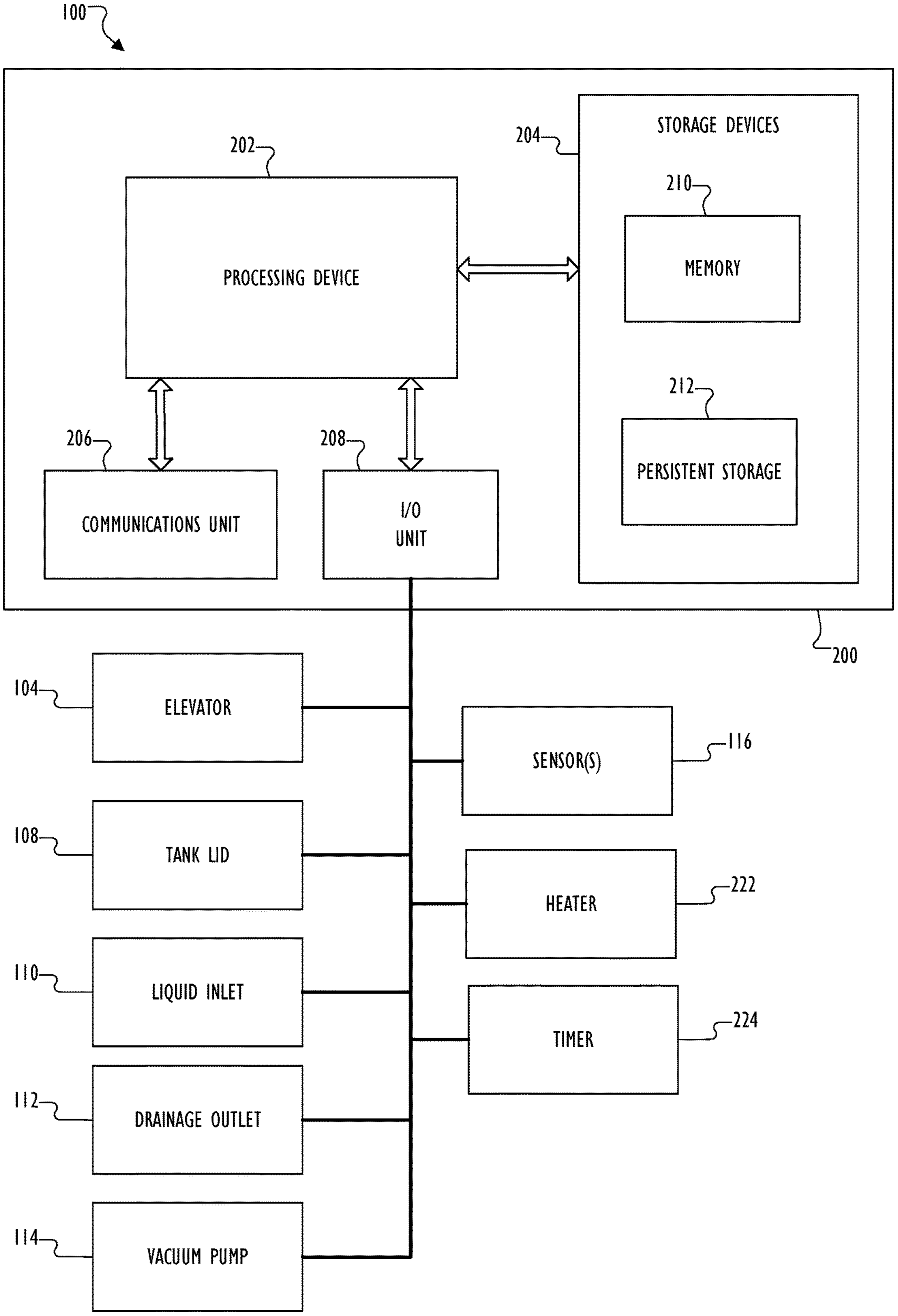
FIG. 2 illustrates an example electronic device supporting automated tempering in a nut processing system according to this disclosure.

As described in more detail below, the nut processing system 100 includes a basket 102, an elevator 104, a tank 106 with a lid 108, a liquid inlet 110, drainage outlet 112, a vacuum pump 114, and one or more sensors 116. A control system 118 controls the nut processing system 100. In certain embodiments, the control system 118 includes at least one electronic device, such as electronic device 200 as shown in FIG. 2. Example implementations of the components of the nut processing system 100 are described in more detail below.

The basket 102 holds a plurality of nuts 120 that have been harvested. The basket 102 is constructed with a material that provides physical support of the weight of the nuts 120, such as in cases in which the nuts are dry and tempered. In some embodiments, the basket 102 is formed from a rigid material, such as metal, that can maintain shape without a deformation resulting from forces of the weight of the nuts when contained within the basket 102. The walls and base of the basket 102 allow liquid (e.g., water) to easily flow through, such that the basket 102 can quickly sink and submerge within a body of water. In some embodiments, the walls and base of the basket 102 are formed from an interlaced structure, such as one or more wires or thread in a mesh pattern. For example, the mesh pattern can be a metal mesh or metal grating. The holes of the mesh can be dimensioned to be small enough to retain the nuts 120 to remain within an inside of the basket 102.

The elevator 104 lifts the nuts 120 to a height above a top of the tank 106. The elevator 104 is configured to detachably connect to the basket 102. That is, the elevator 104 includes one or more coupling mechanisms, such as hooks, clamps, plungers, or indentations, configured to couple to, and detach from, respective coupling mechanisms on the basket 102. Once the basket 102 is attached to the elevator 104, the elevator 104 lifts the basket 102 to a height above the top of the tank 106. The elevator 104 then vertically lowers the basket 102 into the tank 106, and detaches from the basket 102. The elevator 104 can also re-attach to the basket 102 to remove the basket 102 from the tank 106 by vertically lifting the basket 102 from the tank 106 while also translating the basket 102 to position at which the nuts 120 can proceed to a next nut processing step (for example, being deposited into a feed hopper that feeds pecans into a next machine (e.g., nut cracking machine)). In some embodiments, the basket 102 is positioned at a height above the top of the tank 106, and the elevator 104 includes a conveyor belt that lifts the nuts 120 up and drops the nuts into the basket 102. In certain embodiments, the elevator 104 includes a basket elevator that vertically lowers and raises the basket 102 into and out of the tank 106. In certain embodiments, the elevator 104 is not limited to moving the basket vertically; but can move the basket 102 according to six degrees of freedom.

The tank 106 includes a hollow interior space that can hold a liquid. For example, the basket 102 and nuts 120 can be submerged within the liquid within the tank 106. The top of the tank 106 includes the lid 108 that, when in a closed position, is configured to hermetically seal the interior space of the tank 106 from the environment outside the tank 106. In some embodiments, the lid 108 includes a hinge that enables the lid 108 to rotate between an open position and the closed position. When the lid 108 is in the open position, the elevator 104 can insert and remove the basket 102 from the tank 106. When the lid 108 is in the closed position, the interior of the tank 106 is sealed shut and inaccessible. The surface of the lid 108 includes an exterior top surface **108*a* and the interior surface 108*b*. In certain embodiments, the lid includes a seal that forms an interface between the interior surface 108*b* and the top of the tank 108**.

The liquid inlet 110 of the tank 106 includes a valve **110*a* that, in an open position, enables liquid to flow into the interior of the tank 106. When the valve of the liquid inlet 110 is in a closed position, no liquid can flow through into or out of the interior of the tank 106 via the liquid inlet 110. The valve of the liquid inlet 110 is located at a sidewall of the tank 106. In some embodiments, the valve of the liquid inlet 110 is located at a different location, such as in the lid 108 or at a base of the tank 106. In some embodiments, the liquid inlet 110 includes a pipe 110*b* connecting the inlet valve 110*a* in tank 106** to a source of the liquid, such as a water source.

The drainage outlet 112 of the tank 106 can be configured similar to the liquid inlet 110. The drainage outlet 112 includes a valve **112*a*. In some embodiments, the drainage outlet 112 includes a pipe 112*b* connecting the valve 112*a* in tank 106 to a disposal of the liquid, such as a disposal area or other tank. The drainage outlet 112 differs in operation from the liquid inlet 110. For example, when a valve 112*a* of the drainage outlet 112 is in an open position, liquid is allowed to flow out from the interior of the tank 106 to an exterior portion of the tank 106, such as the waste area or other disposal area or tank. The valve 112*a* of the drainage outlet 112 is located at the base of the tank 106. In certain embodiments, the drainage outlet 112** is located in another suitable location for gravity based drainage.

The vacuum pump 114 creates a vacuum within the tank 106 by withdrawing a gas or liquid from within the tank 106, such as by siphoning fluid (i.e., air alone or an air/liquid mixture) out from the sealed interior of the tank 106. Particularly, the vacuum pump 114 creates a vacuum within the tank 106 by creating a negative pressure to draw out air from an air gap AG formed between a top surface of the liquid in the tank 106 and interior surface 108*b* of the lid 108. In some embodiments, the vacuum pump 114 is attached to the tank 106 through the lid 108. For example, the vacuum pump 114 can be coupled to the tank 106 through a pipe that extends from the interior surface 108*b* of the lid 108 to the exterior of the lid 108.

Further, air from an interior of the shells of the nuts 120 can move outside the shell of the nuts and contribute air to the airgap (AG). The vacuum pump 114, by removing the airgap (AG), evacuates air from the interior of the nutshells to outside the tank 106. The evacuated air is replaced with water.

Some of the sensors 116 are mechanical sensors. For example, a level sensor 116*a* (shown as "LS") in the interior of the tank 106 can be a float tethered to the valve 112*a* of the drainage outlet 112. The float can operate in a similar manner as a float inside a toilet tank. The level sensor 116*a*, by remaining atop the surface of the water in the tank 106, pulls and maintains the valve 112*a* of the drainage outlet 112 in the open position so long as the current depth of the water in the tank 106 is greater than a pre-set full water depth (shown as "FD"). The pre-set full water depth is an example of a water amount parameter that is satisfied when the current depth of the water in the tank 106 is substantially equal to the pre-set full water depth, which is a condition in which the valve 112*a* of the drainage outlet 112 transitions to the closed position.

Some of the sensors 116 can be electrical sensors configured to sense phenomena and current conditions associated with the nut processing system 100, generate and send corresponding electric signals to the control system 118. For example, the level sensor 116*a* can include a transmitter and receiver that utilize time of flight information to determine the current depth of the water in the tank 106. Particularly, the level sensor 116*a* can provide a signal indicating to the control system 118 that the current level of the water is substantially equal to a pre-set awaiting nuts depth (shown as "AD"). The pre-set awaiting nuts depth represents a level of a volume water above the base of the tank 106 when the basket 102 and nuts 120 are not within the interior of the tank 106. A volume of water is displaced when the basket 102 and nuts 120 are added to the interior of the tank 106, and the volume of displaced water causes the current depth of water in the tank 106 to rise by the height difference between the pre-set full water depth (FD) and the pre-set awaiting nuts depth (AD). The level sensor 116*a* can provide a signal indicating to the control system 118 that the current level of the water is substantially equal to a pre-set full depth (FD).

The control system 118 is communicably coupled (e.g., via a wireless or via a wired interface) to other components of the nut processing system 100. The control system 118 interacts with and controls the nut processing system 100. For example, the control system 118 sends controls signals to control the speed and states of one or more motors of the elevator 104, which drives moving components of the elevator 104. In a similar manner, the control system 118 uses control signals to control sub-components of other components of the nut processing system 100.

Although FIG. 1 illustrates one example of a nut processing system 100, various changes may be made to FIG. 1. For example, various components in FIG. 1 may be combined, further subdivided, replicated, omitted, or rearranged and additional components may be added according to particular needs.

FIG. 2 illustrates an example electronic device 200 supporting automated tempering in a nut processing system according to this disclosure. The embodiment of the electronic device 200 shown in FIG. 2 is for illustration only. Other embodiments could be used without departing from the scope of the present disclosure. The electronic device 200 of FIG. 2 may, for example, be used in the control system 118 of FIG. 1 to interact with and control operation of the nut processing system 100.

As shown in FIG. 2, the electronic device 200 includes at least one processing device 202, at least one storage device 204, at least one communications unit 206, and at least one input/output (I/O) unit 208. The processing device 202 may execute instructions that can be loaded into a memory 210. The processing device 202 includes any suitable number(s) and type(s) of processors or other processing devices in any suitable arrangement. Example types of processing devices 202 include one or more microprocessors, microcontrollers, digital signal processors (DSPs), application specific integrated circuits (ASICs), field programmable gate arrays (FPGAs), or discrete circuitry. In some embodiments, the processing device 202 is a programmable logic controller (PLC) having user-selectable parameters.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 may support communications with external systems that provide information to the electronic device 200 for use in processing nuts, such as automated tempering of nuts. The communications unit 206 may support communications through any suitable physical or wireless communication link(s), such as a network or dedicated connection(s).

The I/O unit 208 allows for input and output of data. For example, the I/O unit 208 may provide a connection for user input through a keyboard, mouse, keypad, touchscreen, or other suitable input device. The I/O unit 208 may also send output to a display, a speaker, visual indicator, or other suitable output device. The I/O unit 208 can further support communications with various components of the nut processing system 100.

In this example, the nut processing system 100 includes the basket 102, the elevator 104, the tank 106 with the lid 108, the liquid inlet 110, the drainage outlet 112, the vacuum pump 114, the one or more sensors 116, the electronic device 200, a heater 222, and a timer 224. The heater 222 heats water that is added to the interior of the tank 106. One example of the heater 222 includes a tankless water heater coupled to the liquid inlet 110 and configured to heat the liquid flowing into the tank 106 through the liquid inlet 110. Another example of the heater 222 includes a heating element or burner that adds heat to raise the temperature of water already inside the tank 106. The timer 224 counts time elapsed or time remaining, for example, counting current dwell time. Examples, of currently dwell time include how long ago the nuts 120 inside the basket were added to the interior of the tank 106, low long the currently submerged nuts 120 have been submerged, how long currently submerged nuts 120 have been subjected to vacuum pressure, or how long currently submerged nuts 120 have been submerged at a temperature within a specified range of temperatures.

Although FIG. 2 illustrates one example of an electronic device 200 supporting automated tempering in a nut processing system, various changes may be made to FIG. 2. For example, computing devices and systems come in a wide variety of configurations, and FIG. 2 does not limit this disclosure to any particular computing or communication device or system.

Figure 3A:
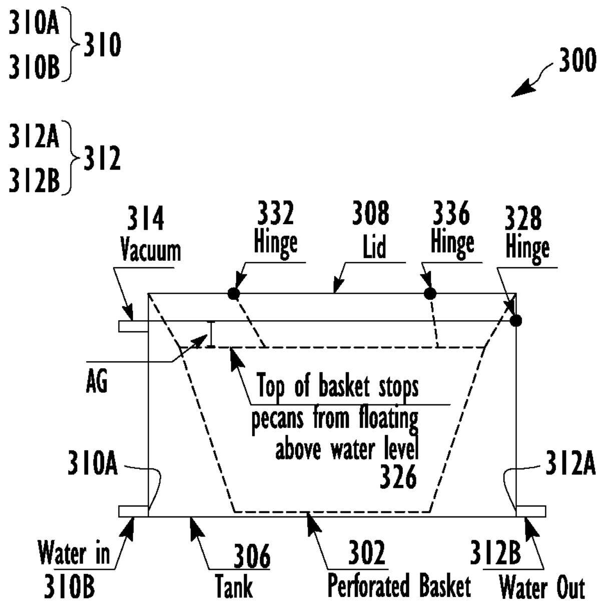
FIGS. 3A-3C illustrate a second example nut processing system according to this disclosure.
Figure 3B:
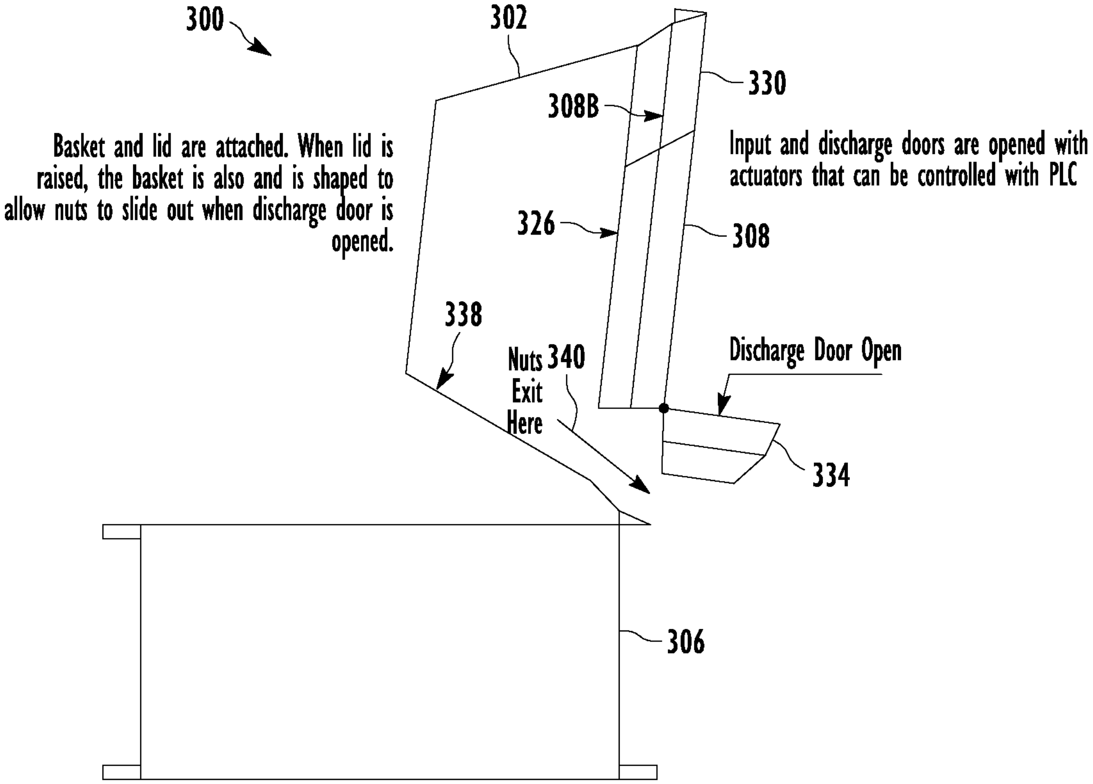
Figure 3C:
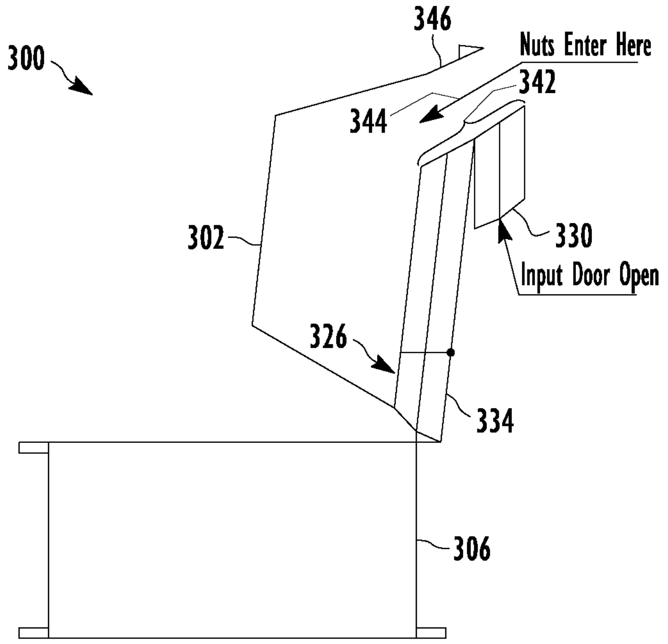

FIGS. 3A-3C (FIG. 3) illustrate a second example nut processing system 300 according to this disclosure. The embodiment of the nut processing system 300 shown in FIG. 3 is for illustration only. Other embodiments could be used without departing from the scope of the present disclosure.

Some components of the nut processing system 300 shown in FIG. 3 may, for example, be used in the nut processing system 100 of FIG. 1. For example, the basket 302, tank 306 with a tank lid 308, a liquid inlet 310, drainage outlet 312, and a vacuum 314 of FIG. 3 could be interchangeable with and perform a similar function as corresponding components: basket 102, tank 106, lid 108, liquid inlet 110, drainage outlet 112, and vacuum pump 114 of the nut processing system 100 of FIG. 1. Similarly, some of the components of the nut processing system 100 of FIG. 1 may be used in the nut processing system 300 of FIG. 3. For example, the sensors 116 and control system 118 of FIG. 1 could be used to detect the status of and to control components in the nut processing system 300 of FIG. 3.

In the example shown in FIG. 3A, the tank lid 308 is in a closed position and sealed with the basket 302 contained within interior space of the tank 306. A basket lid 326 of the perforated basket 302 prevents or stops nuts 120 inside the basket from floating above the surface of water in the tank 306. The basket lid 326 extends from a first wall of the basket 302 to a second wall of the basket 302 on the opposite side of the basket 302 and is formed from the interlaced structure from which the walls and base of the basket 302 are formed.

When water is stored in the tank 306, an air gap AG is formed between the surface of water in the tank and the interior surface 308*b* (FIG. 3B) of the tank lid 308. In some scenarios, the basket lid 326 may define a maximum height of the surface of water in the tank 306 while nuts 120 are in the basket 302, and in such scenarios, an initial air gap may be defined by space between the basket lid 326 and the interior surface of the tank lid 308.

In some embodiments, the shape of the basket 302 is different from the shape of the tank 306. For example, the walls of the basket 302 may be declined such that the width of the base of the basket 302 is narrower than the width of the basket lid 326, which may be narrower than the distance between the tops of the walls of the basket.

The tank lid 308 is attached to the basket lid 326. For example, a first hinge 328 attaches the tank lid 308 to the basket 302 such that when the tank lid 308 is raised to the open position, the basket 302 and tank lid 308 pivot about the first hinge 328 in unison (for example, as a unitary body). That is, the tapered shape of the basket 302 enables the base of the basket to be substantially parallel with the base of the tank 306 when the tank lid 308 is in the closed position. As the basket 302 and tank lid 308 pivot about the first hinge 328 in unison, the tapered shape of the basket 302 also enables the walls of the basket and the base of the basket to avoid colliding with walls of the tank 306. The tank lid 308 includes an input door 330 (FIG. 3B) that pivots about a second hinge 332 from a closed position as shown in FIG. 3A to an open position as shown in FIG. 3C. The tank lid 308 includes a discharge door 334 (FIG. 3B) that pivots about a third hinge 336 from a closed position as shown in FIG. 3A to an open position as shown in FIG. 3B. The tank lid 308 is divided into three sections including the input door 330, discharge door 334, and a center section positioned between the doors 330 and 334. Similarly, the basket lid 326 is divided into an input section, a discharge section, and a center section positioned between the input section and discharge section. The three sections of the basket lid 326 are attached (e.g., inseparably attached via a weld, or removably attached via mechanical fasteners) to, and pivot in unison with, corresponding sections of the tank lid 308. For example, the input, discharge, and center sections of the basket lid 326 can be respectively attached to the input door 330, discharge door 334, and center section of the tank lid 308.

In the example shown in FIG. 3B, the tank lid 308 is in the open position with the basket 302 vertically oriented outside of the tank 306, and the discharge door 334 is in the open position. The declined wall 338 of the basket 302 enables gravity to pull nuts 120 inside the basket 302 down toward an exit opening 340 that is formed by the discharge door 334 in the open position and the declined wall 338. That is, when the discharge door 334 is open, nuts 120 roll or slide through the exit opening 340 and out of the basket 302. In certain embodiments, an elevator or conveyor belt catch and transport the nuts 120 that flow through the exit opening 340.

Referring to FIG. 3C, the tank lid 308 is in the open position with the basket 302 vertically oriented outside of the tank 306, and the input door 330 is in the open position. When the input door 330 is in the open position, an inclined wall 342 is formed by the input door 330 that is in the open position and is colinear with the center section of the tank lid 308. This disclosure is not limited to the inclined wall 342 being planar, and in other embodiments, the inclined wall 342 may include the input door 330 positioned at a non-straight angle relative to the center section of the tank lid 308. An entrance opening 344 is formed by the inclined wall 342 and a wall 346 of the basket 302. The inclined wall 342 of the lids 308 and 326 enables gravity to pull nuts 120 down through the entrance opening 344 toward an interior space of the basket 302. That is, nuts 120 may roll and slide down along the surface of the inclined wall 342. In certain embodiments, in order to load nuts 120 into the basket 302, an elevator or conveyor belt transports nuts 120 to a position above the inclined wall 342 and releases or drops the nuts 120 to fall onto the inclined wall 342.

Although FIG. 3 illustrates one example of a nut processing system 300, various changes may be made to FIG. 3. For example, various components in FIG. 3 may be combined, further subdivided, replicated, omitted, or rearranged and additional components may be added according to particular needs. For example, the nut processing system 300 could optionally include an elevator or conveyor belt that loads nuts into the basket 302 through the entrance opening 344. For example, within the nut processing system 300, the control system 118 controls actuators that open the input door 330 to a specified angle, open the discharge door 334 to a specified angle, and open the tank lid 308 (in unison with) to a specified angle.

Figure 4:
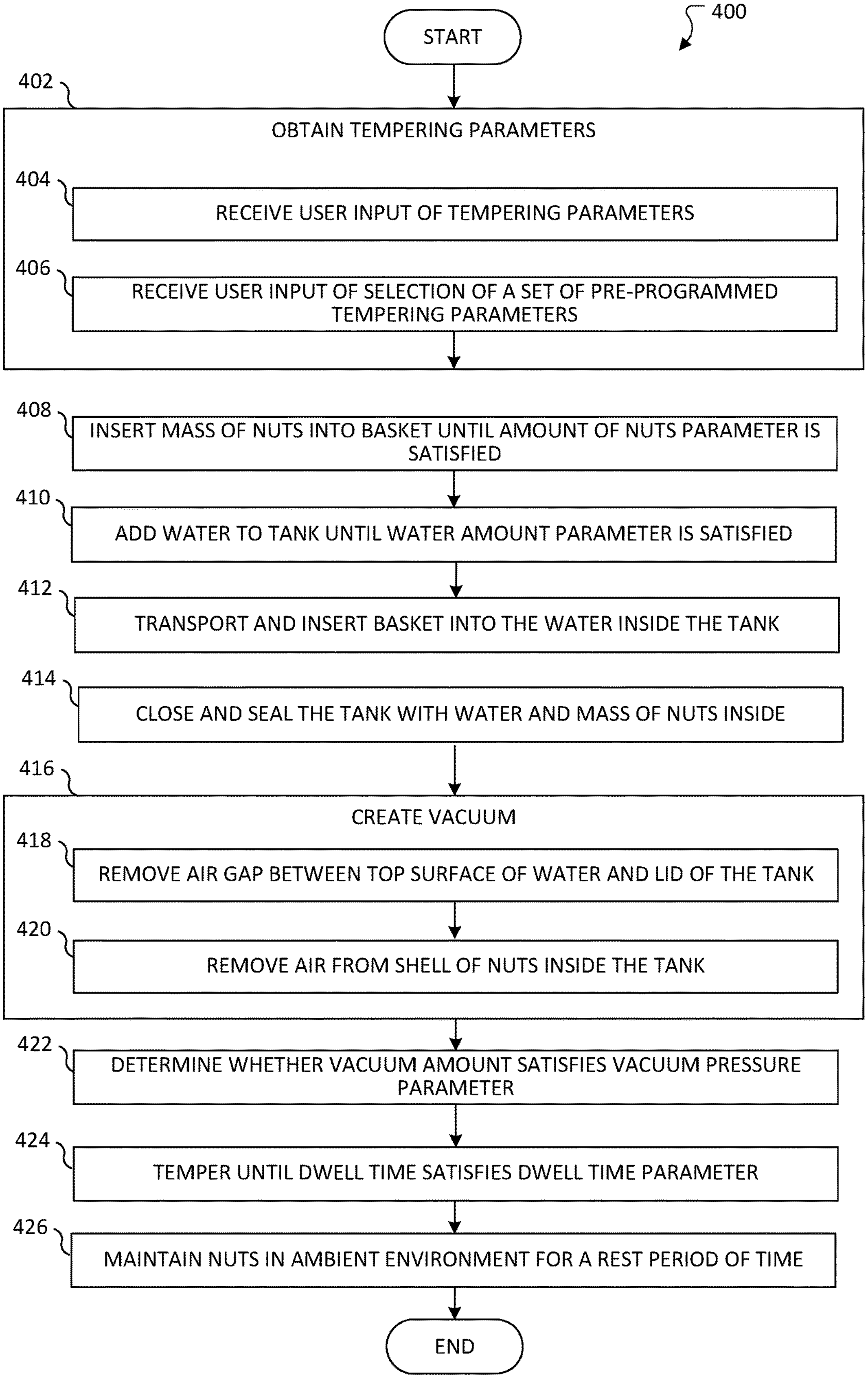
FIG. 4 illustrates an example process for automated tempering using a nut processing system according to this disclosure.

FIG. 4 illustrates an example process 400 for automated tempering using a nut processing system according to this disclosure. For ease of explanation, the process 400 is described as involving the processing device 202 executing program code (instructions) to interact with and control operation of the nut processing system 100, and to present a user interface associated with obtaining tempering parameters. However, the process 400 may involve the use of any other suitable device in any other suitable system, and the process 400 may involve any suitable user interface.

As shown in FIG. 4, at block 402, the processing device 202 obtains tempering parameters. Some tempering parameters are user-customizable and others are not user-customizable. In certain embodiments, the processing device 202 obtains tempering parameters by receiving, at block 404, user input of tempering parameters. For example, the processing device 202 (using the I/O unit 208) obtains a water amount parameter in response to the user typing in a numerical value (e.g., 100 gallons) representing the pre-set full water depth (FD). The user may input a specific numerical value for each of the user-customizable tempering parameters. In certain embodiments, the processing device 202 obtains tempering parameters by receiving, at block 406, user input of a selection of a set of pre-programmed tempering parameters. For example, the processing device 202 may display a user interface prompting the user to select from among a first set, a second set, and a third set of pre-programmed tempering parameters as shown in Table 1 below. Each set of pre-programmed tempering parameters can include a nut type parameter, a water amount parameter, an amount of nuts parameter, a vacuum pressure parameter, a dwell time parameter, a rest period parameter, and one or more ambient parameters. Examples of ambient parameters include room temperature, and/or air velocity. A set of pre-programmed tempering parameters can include additional or alternative parameters, such as water temperature, and type of nut (e.g., pecan, peanut, almond, Brazil nut, etc.). The type of nut parameter for pecans can include thick-shell varieties (e.g., Stuart cultivars, varieties native to Texas, or varieties native to Oklahoma), or thin-shell varieties. Thin-shell varieties are also referred to as "papershell" pecans. In a particular example, Table 2 shows that a user can select from among multiple sets of pre-programmed tempering parameters corresponding to various levels of moisture content of thick-shell varieties of pecans desired by the user. As another particular example, multiple sets of dry, normal, and extra moist pre-programmed tempering parameters can include different dwell times, such as 10, 15, and 20 minutes respectively, and can share a single vacuum pressure parameter, such as 26 inches of mercury, and a single water temperature parameter, such as below room temperature. In another particular example, the multiple sets of dry, normal, and extra moist pre-programmed tempering parameters can include different dwell times, such as 15, 10, and 20 minutes respectively, and can share a single water temperature parameter, such as above room temperature. In certain embodiments, the processing device 202 obtains the tempering parameters by at least one of: accessing tempering parameters (for example, default tempering parameters) that are stored in the storage device 204 or in an external device (for example, a server), receiving user input of a value of one or more tempering parameters, and receiving user input of a selection of a set of pre-programmed tempering parameters. The obtained tempering parameters can include a combination of some tempering parameters that the processing device 202 received (at block 404) via a first user input; some tempering parameters received (at block 406) via a second user input; and some tempering parameters accessed from the storage device (or external device).

TABLE 1

Sets of Pre-Programmed Tempering Parameters

| Parameters | First Set | Second Set | Third Set |
|---|---|---|---|
| Nut Type | Nut1 | Nut1 | Nut2 |
| Water Amount | w gallons | w + 20 gallons | w + 100 gallons |
| Amount of Nuts | x pounds | y cubic meters | x + 30 cubic meters |
| Vacuum Pressure | z atm | z atm | z + 7 PSIA |
| Dwell Time | t minutes | t + 2 minutes | t + 4 minutes |

TABLE 2

Another Multiple Sets of Pre-Programmed Tempering Parameters

| Parameters | Dry Set | Normal Set | Extra Moist Set |
|---|---|---|---|
| Nut Type | Nut1 | Nut1 | Nut1 |
| Vacuum Pressure | 20 inches of mercury | 26 inches of mercury | 26 inches of mercury |
| Dwell Time | 12 minutes | 10 minutes | 15 minutes |
| Moisture Content of Nut Post-Tempering | Less than 6% | Inclusively between 6% and 6.5% | Greater than 6.5% |
| Rest Period | 20 minutes | 12 minutes | 5 minutes |

Some tempering parameters are user-customizable only within a pre-determined range of capabilities of components of the nut processing system. For example, a volume of the tank 106 can limit the water amount parameter, or an operating limit of a vacuum pump 114 can limit the vacuum pressure parameter. In certain embodiments, a designer of the nut processing system can limit the vacuum pressure parameter to a range that produces suitably tempered nuts, such as a range between 20 and 29 inches of mercury. This range is an example only, and the designer can set different limits that produce suitably tempered nuts, for example, the rest time can be limited to a range between 5 and 20 minutes; the dwell time can be limited to a range between 10 and 20 minutes. In certain embodiments, limits on ranges of tempering parameters that can be selected depends on which nut type parameter is selected. For example, thin-shell varieties of pecans absorb moisture quicker than thick-shell varieties, and the limits on ranges of tempering parameters can be lesser if the thin-shell varieties is selected as the nut type parameter.

At block 408, the processing device 202 inserts a mass of nuts 120 into the basket 102 until a nuts condition corresponding to the amount of nuts parameter is satisfied. For example, the nuts condition may be satisfied when the current quantity or volume of nuts in the basket 102 is substantially equal to the amount of nuts parameter. In certain embodiments, inserting a mass of nuts 120 into the basket 102 includes controlling a conveyor belt of the elevator 104 to transport nuts 120 into the basket 102 (or alternatively, into the tank 106 of water), and receiving weight measurements from a weight sensor or volumetric measurements from a volumetric sensor that outputs a measured value of the amount of nuts inserted into the basket 102. The amount of nuts parameter indicates the quantity or volume of nuts to be fed into the tank 106, for example, when the basket 102 is lowered into the tank 106. As another example, the nuts condition may be satisfied when the conveyor belt of the elevator 104 has been operating, transporting nuts 120 into the basket 102 or adding nuts into the tank 106, for a specified period of time that corresponds the mass of nuts 120 being equivalent to the amount of nuts parameter.

Further, to determine whether the nuts condition is satisfied, the processing device 202 compares a measured value (e.g., measured volume or measured weight) of the mass of nuts 120 to the amount of nuts parameter that defines a range of volume or range of weight. In response to a determination that the nuts condition is not satisfied based on a comparison result that the measured value of the mass of nuts is less than the amount of nuts parameter, the processing device 202 outputs a first signal associated with adding nuts to the basket 102. In response to a determination that the nuts condition is satisfied, the processing device 202 outputs a second signal associated with stopping nuts from being added to the basket 102. In response to a determination that the nuts condition is not satisfied based on a determination that the measured value of the mass of nuts 120 is greater than the amount of nuts parameter, the processing device 202 outputs a third signal associated with removing nuts from the basket 102 or tank 106.

In certain embodiments, the first, second, and third signals can control an output device to indicate to a user of the nut processing system that nuts should be added or removed from the basket 102 or tank 106. For example, to output the third signal, the processing device 202 sends the third signal to at least one output device (e.g., speaker or visual indicator) that indicates to a user that the measured value of the mass of nuts 120 is greater than the amount of nuts parameter. The third signal, when received by the output device, causes the output device to indicate to the user to remove nuts from the basket 102 or to remove an excess nuts (i.e., different between the amount of nuts parameter and the measured value of the nuts). Similarly, the processing device 202 outputs by sending the first signal or second signal to the output device that respectively indicates to the user that the measured value of the mass of nuts 120 is less than the amount of nuts parameter or indicates to the user that the nuts condition is satisfied. The second signal can cause the output device to indicate that the lid 108 should be closed and sealed.

In certain embodiments, the first and second signals can control the elevator 104 (e.g., conveyor belt) to add or stop adding nuts into the basket 102 or tank 106. The third signal can control the basket elevator of the elevator 104 to raise the basket 102 and open the discharge door 334 such that some of the nuts flow out of the basket 102 through the exit opening 340. More particularly, the processing device 202 outputs by sending the first signal to the elevator 104 (e.g., conveyor belt), which in response to receipt of the first signal, transports and adds nuts into the basket 102. Similarly, the second signal, when received by the elevator 104 from the processing device 202, causes the conveyor belt of the elevator 104 to stop transporting adding nuts into the basket 102. The processing device 202 triggers at least one motor of the elevator 104 to lower (e.g., transport) the basket 102 into the tank 106 such that the amount of nuts contained in the basket becomes the nuts contained in the tank At block 410, the processing device 202 adds water into the tank 106 until a water condition corresponding to the water amount parameter is satisfied. For example, the water condition may be satisfied when the current amount of water in the tank 106 is substantially equal to the water amount parameter. In certain embodiments, adding water into the tank 106 includes controlling the open/closed positions of the valve 110*a* of the liquid inlet 110 and receiving measurements from a level sensor 116*a*. More generally, the processing device 202 controls at least one valve 110*a*, 112*a* to adjust the water in the tank until a measured value of the water in the tank 106 is within a range defined by the water amount parameter. The measured value of water can be a measured water level, measured airgap height, or measured volume of water. For example, the processing device 202 can control a valve 112*a* of the drainage outlet 112 to remove water from the tank 106 based on a determination that the measured value of the water in the tank 106 is greater than the range defined by the water amount parameter.

At block 412, the processing device 202 transports and inserts the basket 102 containing the mass of nuts 120 into the water in the interior of the tank 106. Particularly, the processing device 202 controls the elevator 104 to move the basket 102. At block 414, the processing device 202 closes and seals the tank 106 with water and the mass of nuts 120 inside. Particularly, the processing device 202 closes and seals the tank 106 by controlling the open/closed position of the lid 108. In certain embodiments, the processing device 202 closes and seals the tank 106 with the mass of nuts 120 inside, and then adds water to the tank 106 according to the procedures performed at block 412.

At block 416, the processing device 202, by controlling the vacuum pump 114, creates a vacuum within the interior of the sealed tank 106. More particularly, the processing device 202 creates a vacuum by removing (at block 418) the air gap AG between the top surface of the water in the tank 106 and the lid 108 of the tank. Additionally, the processing device 202 creates or maintains the vacuum by removing (at block 420) air from nutshells inside the tank.

At block 422, the processing device 202 determines whether a vacuum pressure condition corresponding to the vacuum pressure parameter is satisfied. For example, the vacuum pressure condition may be satisfied when a measured value of the current amount of vacuum pressure in the tank 106 is substantially equal to the vacuum pressure parameter. In certain embodiments, the processing device 202 controls the vacuum pump 114 to continue pumping out air from the interior of the tank until the condition corresponding to the vacuum pressure parameter is satisfied. Determining whether the vacuum pressure condition corresponding to the vacuum pressure parameter is satisfied includes receiving the measured value of the current vacuum pressure from a vacuum pressure sensor.

At block 424, in response to a determination that the vacuum pressure condition is satisfied, the processing device 202 tempers the nuts 120 in the tank for the dwell time until a condition corresponding to the dwell time parameter is satisfied. For example, the condition may be satisfied when the elapsed dwell time of nuts 120 in the basket 102 being in the tank 106 is substantially equal to the dwell time parameter. In certain embodiments, the processing device 202 controls a timer to start and stop based on tempering parameters.

In some embodiments, the process 400 includes in response to determining the mass of nuts 120 in the tank 106 having the created vacuum have been tempered for at least a specified dwell time (e.g., a value of the dwell time parameter), removing the mass of nuts 120 from the water in the tank 106. For example, the processing device 202, in response to determining the condition corresponding to the dwell time parameter is satisfied, removes the mass of nuts 120 from the water in the tank 106. Examples of removing the mass of nuts 120 from the water in the tank 106 includes one or a combination of the following: controlling the valve of the drainage outlet 112 to transition to the open position; controlling the lid 108 to transition to the open position; and controlling the elevator to lift the basket 102 containing the nuts 120 out of the tank 106.

At block 426, after the tempering for the dwell time, the processing device 202 maintains the tempered nuts in a non-vacuum environment for a rest period defined within the set of tempering parameters. To maintain or allow the tempered nuts to rest in the non-vacuum environment, the processing device 202 controls the vacuum pump to remove the vacuum inside the sealed tank (for example, to 0 inches of mercury). The non-vacuum environment can include various alternative situations, including: (1) a situation in which the nuts remain submerged in the water in the tank 106; (2) a situation in which the nuts are removed from the water by (e.g., water is removed from the tank via the drainage outlet 112) and rest inside the tank 106; or (3) a situation in which the basket 102 containing the nuts is raised out of the water such that the nuts are exposed to an ambient environment. In an additional example in the embodiment of maintaining the tempered nuts in the ambient environment for the rest period, at block 426, after the tempering for the dwell time, the processing device 202 maintains the tempered nuts in an ambient environment for a rest period defined within the set of tempering parameters. In certain embodiments, the temperature and air velocity in the ambient environment is controlled by the room temperature parameter and air velocity parameter from among the tempering parameters. For example, the ambient environment could be indoors in a factory or warehouse setting such that the heating ventilation and air conditioning (HVAC) system and fans are controlled by the room temperature parameter and air velocity parameter. In certain embodiments, the rest period parameter is a period of time that can be between 5 and 20 minutes. To maintain or allow the tempered nuts to rest in the ambient environment, the processing device 202 controls the vacuum pump to remove the vacuum inside the sealed tank (for example, to 0 inches of mercury); controls the elevator 104 to raise the basket 102 out of (above the surface of the water in the tank 106). The perforations of the basket 102 enables the mass of nuts 120 to be exposed to the ambient environment outside the tank 106. During the rest period, the nut processing system can pour the mass of nuts 120 onto a conveyor belt that transports the nuts to a next phrase (such as a sanitizer) of the nut processing system. The processing device 202 triggers at least one motor of the conveyor belt to transport the tempered nuts to the sanitizer within the nut processing system, for example, transporting the tempered nuts during the rest period. In certain embodiments, the processing device 202 disables the next phase of the nut processing system during the rest period, which ensures that the tempered nuts are subjected to the ambient environment during the rest period.

In response to a determination that the rest period has lapsed, the processing device 202 enables the nut processing system to execute a function corresponding to a next phase of the nut processing system. As a non-limiting example, the next phase of the nut processing system can include a function to sanitize the nuts using the sanitizer. The sanitization phase can include submerging the tempered nuts in hot water, for example, water that is approximately 200 degrees Fahrenheit. Alternatively, the sanitization phase can include submerging the tempered nuts in cold water that contains a chorine solution. Embodiments of this disclosure are limited to the sanitization phase of the nut processing system follow the tempering phase, and another phase of the nut processing system can be the next phase that follows the tempering phase. For example, the next phase that follows the tempering phase can be a cracking phase in which a nutcracker cracks, or a nut moisture testing phase in which a moisture meter measures the moisture level of the nuts. In certain embodiments, the tempering phase occurs after the sanitization phase.

Although FIG. 4 illustrates one example of a method for automated tempering using a nut processing system, various changes may be made to FIG. 4. For example, various components in FIG. 4 may be combined, further subdivided, replicated, omitted, or rearranged and additional components may be added according to particular needs. As a particular example, in response to detecting that the conditions corresponding to the vacuum pressure parameter and corresponding to the dwell time parameter are satisfied, the processing device 202 triggers a dump in which the elevator 104 and/or basket 102 automatically dumps out the tempered mass of nuts 120 into a feed hopper. The feed hopper feeds the nuts onto or into the next machine.

In certain embodiments according to the present disclosure, nuts 120 are manually fed into the tank 106 by an operator (e.g., human), who lifts the mass of nuts up and drops the nuts into water in the tank 106. The operator manually closes the lid 108 of the tank 106 and may engage a latch to seal the tank. The operator pushes a button to create the vacuum. The button is a component of the nut processing system 100 (e.g., within the control system 118) or on a user interface of the electronic device 200. In response to the button being depressed or engaged, the nut processing system 100 (e.g., within the control system 118) initiates the vacuum pump 114. When vacuum has been created and the condition corresponding to the vacuum pressure parameter is satisfied, the timer 224 will indicate to the operator when the condition corresponding to the dwell time parameter is satisfied. Then, the operator may manually remove nuts from tank 106 and send the mass of pecans "down the line" to the next machine, such as to the mechanized nut cracker machine.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:

controlling, by at least one processor, a vacuum pump to create a vacuum inside a tank that is sealed closed, the sealed tank containing water and nuts; and tempering the nuts in the tank having the vacuum such that kernels inside uncracked nutshells absorb at least some of the water contained in the tank; and removing the vacuum from the tank containing the water and the tempered nuts, wherein the tempered nuts are uncracked.

2. The method of claim 1, further comprising:

obtaining, by the at least one processor, a set of tempering parameters that includes a nut type parameter and a time specified that corresponds to the nut type parameter, wherein tempering the nuts in the tank having the vacuum comprises:

tempering, based on the time specified, the nuts in the tank having the vacuum.

3. The method of claim 2, wherein the time specified includes at least one of:

how long the nuts are in an interior of the tank;

how long the nuts have been submerged in the water in the tank;

a dwell time of how long the nuts submerged in the water are subjected to a vacuum pressure of the vacuum created by the vacuum pump; or how long the nuts are submerged in the water at a temperature within a specified range of temperatures.

4. The method of claim 1, further comprising:

obtaining, by the at least one processor, a set of tempering parameters; and controlling at least one valve to adjust the water in the tank based on a water parameter among the set of tempering parameters.

5. The method of claim 4, further comprising:

controlling the at least one valve to adjust the water in the tank until a measured value of the water in the tank is within a range defined by the water parameter, wherein controlling at least one valve to adjust the water in the tank comprises:

adding water into the tank by opening a liquid inlet valve among the at least one valve.

6. The method of claim 1, further comprising measuring, by at least one sensor, at least one of:

a value of the water in the tank; or a value of nuts to be added into the tank, wherein the nuts to be added into the tank, after added into the tank, are the nuts in the tank.

7. The method of claim 1, further comprising:

draining at least some of the water from the tank through a drainage outlet of the tank by opening a drainage valve among at least one valve to adjust the water in the tank.

8. The method of claim 1, further comprising:

obtaining, by the at least one processor, a set of tempering parameters that includes an amount of nuts parameter; and controlling, by the at least one processor, at least one actuator of a nut processing system to adjust a current amount of the nuts in the tank based on the amount of nuts parameter.

9. The method of claim 8, further comprising:

determining whether a measured value of the nuts in the tank satisfies a nuts condition defined by the amount of nuts parameter; and controlling, by the at least one processor, the at least one actuator until the measured value of the nuts in the tank is within a range defined by the amount of nuts parameter, by at least one of:

in response to a determination that the nuts condition is not satisfied based on a determination that the measured value of the nuts is less than the amount of nuts parameter, sending a first signal that is associated with adding nuts into the tank to control the at least one actuator; or in response to a determination that the nuts condition is satisfied, sending a second signal that is associated with stopping nuts from being added into the tank to control the at least one actuator.

10. The method of claim 1, further comprising:

controlling, by the at least one processor, at least one actuator of a nut processing system to discard at least some of the nuts from the tank, wherein the nuts in the tank having the vacuum include uncracked pecans.

11. A system comprising:

a tank configured to contain water and nuts and to seal closed;

a vacuum pump coupled to the tank;

at least one processor operably coupled to the vacuum pump and configured to:

control the vacuum pump to create a vacuum inside the tank that is sealed closed, including while the sealed tank contains the water and the nuts;

temper the nuts in the tank having the vacuum such that kernels inside uncracked nutshells absorb at least some of the water contained in the tank; and remove the vacuum from the tank containing the water and the tempered nuts, wherein the tempered nuts are uncracked.

12. The system of claim 11, wherein the at least one processor is further configured to:

obtain a set of tempering parameters that includes a nut type parameter and a time specified that corresponds to the nut type parameter; and temper the nuts in the tank having the vacuum by:

tempering, based on the time specified, the nuts in the tank having the vacuum.

13. The system of claim 12, wherein the time specified includes at least one of:

how long the nuts are in an interior of the tank;

how long the nuts have been submerged in the water in the tank;

a dwell time of how long the nuts submerged in the water are subjected to a vacuum pressure of the vacuum created by the vacuum pump; or how long the nuts are submerged in the water at a temperature within a specified range of temperatures.

14. The system of claim 11, wherein the at least one processor is further configured to:

obtain a set of tempering parameters; and control at least one valve to adjust the water in the tank based on a water parameter among the set of tempering parameters.

15. The system of claim 14, wherein:

the at least one valve includes a liquid inlet valve configured to couple to at least one inlet of the tank; and the at least one processor is further configured to:

control the at least one valve to adjust the water in the tank until a measured value of the water in the tank is within a range defined by the water parameter, by adding water into the tank by opening the liquid inlet valve.

16. The system of claim 11, further comprising at least one sensor configured to measure at least one of: a value of the water in the tank; or a value of nuts to be added into the tank, wherein the nuts to be added into the tank, after added into the tank, are the nuts in the tank.

17. The system of claim 11, further comprising at least one valve including a drainage valve configured to couple to a drainage outlet of the tank, wherein:

the tank comprises the drainage outlet; and the at least one processor is further configured to:

drain at least some of the water from the tank through the drainage outlet of the tank by opening the drainage valve to adjust the water in the tank.

18. The system of claim 11, wherein the at least one processor is further configured to:

obtain a set of tempering parameters that includes an amount of nuts parameter; and control at least one actuator of a nut processing system to adjust a current amount of the nuts in the tank based on the amount of nuts parameter.

19. The system of claim 18, wherein the at least one processor is further configured to:

determine whether a measured value of the nuts in the tank satisfies a nuts condition defined by the amount of nuts parameter; and control the at least one actuator until the measured value of the nuts in the tank is within a range defined by the amount of nuts parameter, by at least one of:

in response to a determination that the nuts condition is not satisfied based on a determination that the measured value of the nuts is less than the amount of nuts parameter, sending a first signal that is associated with adding nuts into the tank to control the at least one actuator; or in response to a determination that the nuts condition is satisfied, sending a second signal that is associated with stopping nuts from being added into the tank to control the at least one actuator.

20. The system of claim 11, wherein the at least one processor is further configured to:

control at least one actuator of a nut processing system to discard at least some of the nuts from the tank, wherein the nuts in the tank having the vacuum include uncracked pecans.

* * * * *